United States Patent
Lee et al.

(10) Patent No.: US 9,780,595 B2
(45) Date of Patent: Oct. 3, 2017

(54) LOW POWER DETECTION OF WIRELESS POWER DEVICES

(75) Inventors: Kevin D Lee, San Diego, CA (US); Zhen Ning Low, La Jolla, CA (US); Francesco Carobolante, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 814 days.

(21) Appl. No.: 13/030,045

(22) Filed: Feb. 17, 2011

(65) Prior Publication Data

US 2012/0025624 A1    Feb. 2, 2012

Related U.S. Application Data (60) Provisional application No. 61/368,581, filed on Jul. 28, 2010.

(51) Int. Cl.
*H01F 38/14* (2006.01)
*H02J 7/02* (2016.01)

(52) U.S. Cl.
CPC .................................. *H02J 7/025* (2013.01)

(58) Field of Classification Search
USPC ......................................... 307/104; 340/10.34
See application file for complete search history.

(56) References Cited

U.S. PATENT DOCUMENTS

| | | | | |
|---|---|---|---|---|
| 8,476,788 B2 * | 7/2013 | Karalis | ................. | B60L 3/0069 307/104 |
| 2006/0273749 A1 * | 12/2006 | Im | ........................ | G05D 1/0225 318/587 |
| 2007/0139000 A1 | 6/2007 | Kozuma et al. | | |
| 2008/0094027 A1 | 4/2008 | Cho | | |
| 2009/0261778 A1 * | 10/2009 | Kook | .................... | H02J 7/0044 320/108 |
| 2009/0278666 A1 * | 11/2009 | Yoda et al. | ................. | 340/10.34 |
| 2015/0145473 A1 * | 5/2015 | Shen | ....................... | H02J 7/007 320/108 |

FOREIGN PATENT DOCUMENTS

| | | |
|---|---|---|
| CN | 100362725 C | 1/2008 |
| CN | 201349139 Y | 11/2009 |
| CN | 101621219 A | 1/2010 |
| CN | 201478847 U | 5/2010 |
| JP | 2001309578 A | 11/2001 |
| JP | 2004254805 A | 9/2004 |

(Continued)

OTHER PUBLICATIONS

International Search Report and Written Opinion—PCT/US2011/045409—ISA/EPO—Feb. 7, 2012.

*Primary Examiner* — Rexford Barnie
*Assistant Examiner* — Elim Ortiz (57) ABSTRACT

Exemplary embodiments are directed to detection and validation of wirelessly chargeable devices positioned within a charging region of a wireless power transmitter. A device may include a wireless power transmitter configured detect a change in at least one parameter at the transmitter. The transmitter may further be configured to determine whether at least one valid chargeable device is positioned within a charging region of the transmitter upon detecting the change in the at least one parameter.

24 Claims, 5 Drawing Sheets

(56) References Cited

FOREIGN PATENT DOCUMENTS

| JP | 2006246633 A | 9/2006 | | |
|---|---|---|---|---|
| JP | 2007514400 A | 5/2007 | | |
| JP | 2007537688 A | 12/2007 | | |
| JP | 2009159684 A | 7/2009 | | |
| JP | 2009273307 A | 11/2009 | | |
| JP | 2011500203 A | 1/2011 | | |
| JP | 2012504931 A | 2/2012 | | |
| WO | WO-2005109597 A1 | 11/2005 | | |
| WO | WO2006101285 A1 | 9/2006 | | |
| WO | WO 2006101285 A1 * | 9/2006 | ................ | H02J 7/02 |
| WO | WO 2009051538 A1 * | 4/2009 | ................ | H02J 5/00 |
| WO | WO2009051538 A1 | 4/2009 | | |
| WO | WO-2010040015 A2 | 4/2010 | | |

* cited by examiner

LOW POWER DETECTION OF WIRELESS POWER DEVICES

CLAIM OF PRIORITY UNDER 35 U.S.C. §119

This application claims priority under 35 U.S.C. §119(e) to:

U.S. Provisional Patent Application 61/368,581 entitled "INITIATING COMMUNICATIONS WITH LOW POWER" filed on Jul. 28, 2010, the disclosure of which is hereby incorporated by reference in its entirety.

BACKGROUND

Field

The present invention relates generally to wireless power, and more specifically, to a wireless power transmitter for detecting valid chargeable devices positioned within an associated charging region.

Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

In wireless power applications, it may be desirable to conserve energy when devices are not being charged. A need exist for methods, systems, and devices for detecting chargeable devices while conserving energy in wireless power transmitters.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors. Hereafter, all three of this will be referred to generically as radiated fields, with the understanding that pure magnetic or pure electric fields do not radiate power. These must be coupled to a "receiving antenna" to achieve power transfer.

Figure 1:
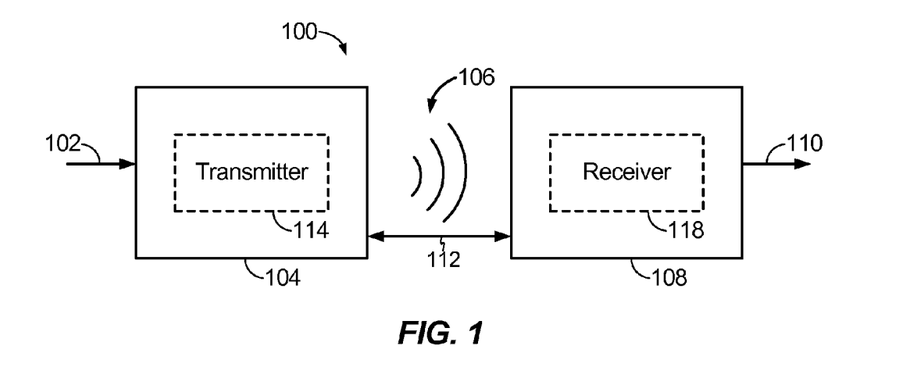
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
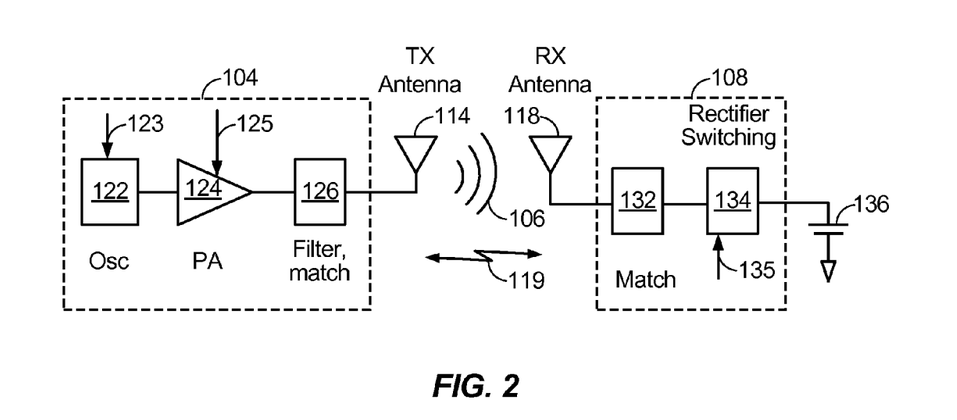
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
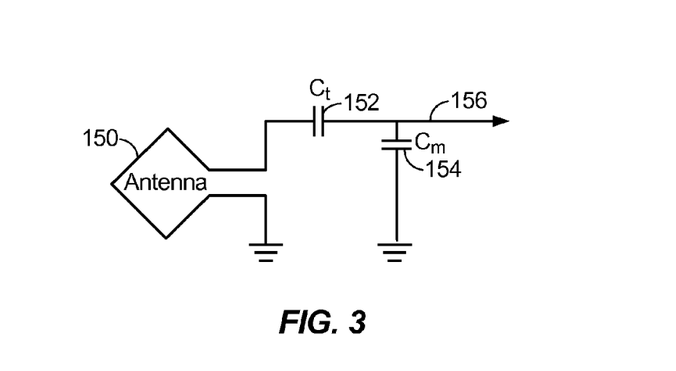
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
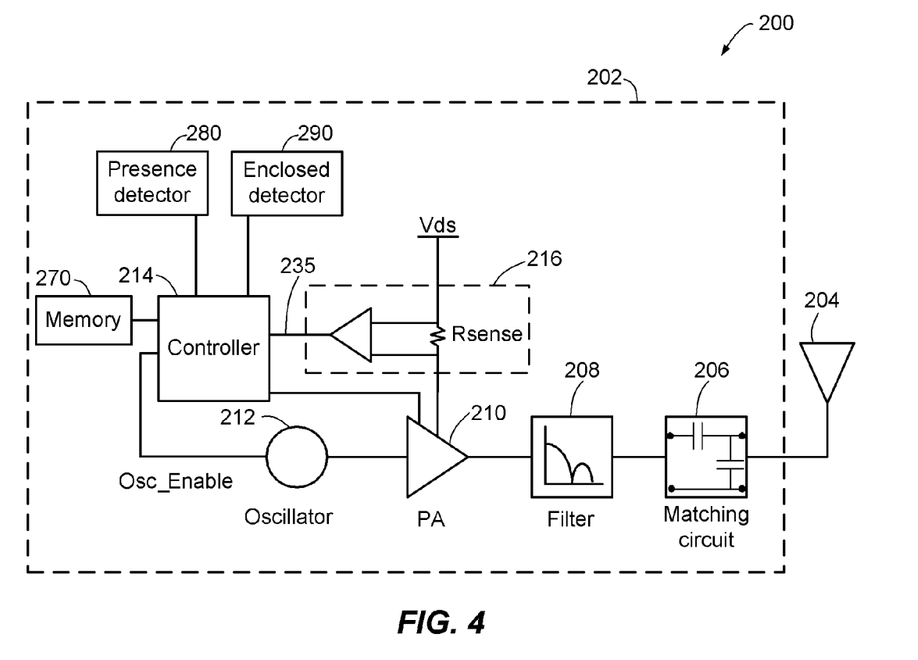
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
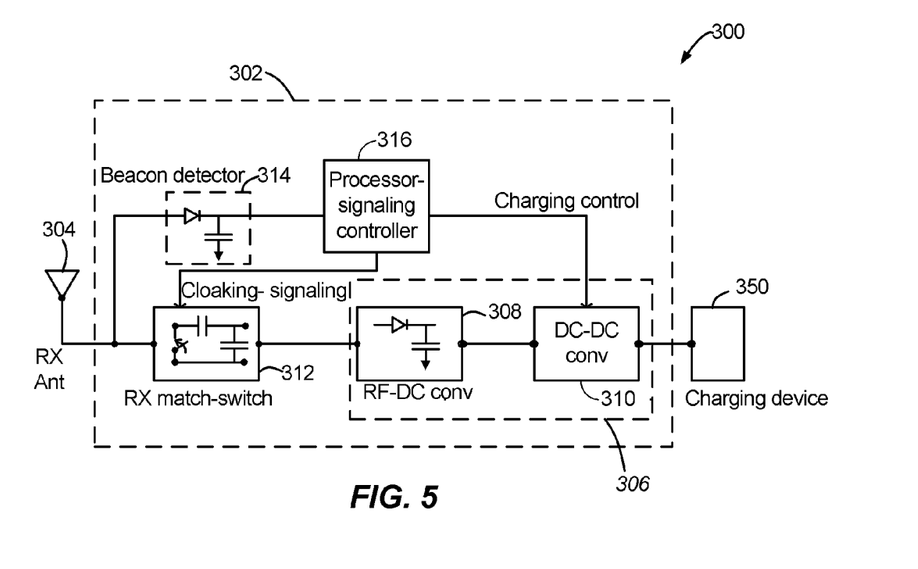
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter.

From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

It is noted that the exemplary embodiments described herein may be implemented within any suitable wireless power applications, such as wireless charging of mobile devices (e.g., mobile telephones, media players, etc.) or electric vehicles.

As will be appreciated by a person having ordinary skill in the art, it may be advantageous to detect when a device is positioned within a charging region of a wireless power transmitter. Further, it may be advantageous to be able to determine whether or not the detected device is a valid chargeable device.

Exemplary embodiments, as described herein, relate to detection of valid chargeable devices positioned within a charging region of a wireless power transmitter while conserving energy in the wireless power transmitter. According to one exemplary embodiment, a wireless power transmitter may enter a low-power mode during a period in which the wireless power transmitter is not transmitting power (e.g., a time period in which a charging region of the wireless power transmitter does not include any receivers). While in the low-power mode, the wireless power transmitter may measure a sensed current and compare the measured current to a previously defined baseline current. If the measured current is substantially equal to the baseline current, the wireless power transmitter may enter a sleep mode and, after a delay, may again measure a current and compare the measured current to the baseline current.

Further, if the measured current is different than the baseline current, a potential charging device may be present within a charging region of the wireless power transmitter and, therefore, the wireless power transmitter may attempt to establish a communication link with the potential device. If a communication link is established, the presence of a charging device may be verified. If the wireless power transmitter is unable to establish a communication link, the presence of charging device is not verified.

With reference again to FIG. 4, as previously noted, load sensing circuit 216 may be configured to measure a bias current level provided to transmitter power amplifier 210 to detect the presence or absence devices in the vicinity of the near-field generated by transmit antenna 204. According to one exemplary embodiment, transmitter 202 may be configured to sense a change in impedance (e.g., reactance) at transmitter 202.

Moreover, controller 214 may be configured for storing a measured bias current level as a baseline current within memory 270, and, thereafter, comparing a subsequently measured bias current level to the baseline current. Furthermore, it is noted that controller 214 may be configured for adjusting a power mode of transmitter 202. More specifically, controller 214 may be configured to reduce a power level, or possibly turn off the power, of transmitter 202.

According to one exemplary embodiment, transmitter 202 may be configured to detect a presence of a device within an associated charging region while in a low-power mode. More specifically, transmitter 202, via controller 214, may be configured to transition to a low-power mode while an associated charging region lacks any detectable devices and the transmitter is not transmitting power. Furthermore, load sensing circuit 216 may be configured to measure a current level provided to power amplifier 210.

If a baseline current level is not stored within memory 270, transmitter 202, and more specifically, controller 214 may be configured to store the sensed current level as a baseline current level within memory 270. After storing a baseline current level, transmitter 202 (i.e., controller 214) may further decrease an associated power level, or the power of transmitter 202 may be turned off entirely. After a short delay (e.g., 1 second), transmitter 202 may again transition to the low-power mode.

If, upon measuring a current level, a baseline current is already stored within memory 270, transmitter 202, and more specifically, controller 214 may be configured to compare the measured current level to the stored baseline current. If the measured current is substantially equal to the baseline current, transmitter 202 (i.e., controller 214) may further decrease an associated power level, or the power of transmitter 202 may be turned off entirely. After a short delay, transmitter 202 may again transition to the low-power mode. If the measured current is not substantially equal to the baseline current (i.e., an amount of current sensed by the transmitter has changed), transmitter 202 may be configured to determine whether an associated charging region includes a valid chargeable device. By way of example, transmitter 202 (i.e., controller 214) may attempt to establish a communication link with the detected device to determine whether an associated charging region includes a valid chargeable device.

If transmitter 202 determines that a valid chargeable device exists within the charging region (e.g., transmitter 202 successfully establishes a communication link with a chargeable device), transmitter 202 may transmit power thereto. If transmitter 202 determines that a valid chargeable device does not exist within the charging region (e.g., transmitter 202 is unable to establish a communication link with a chargeable device), transmitter 202 may be configured to store the measured current level as the baseline current level.

As noted above, the resonant frequency of a loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. According to one exemplary embodiment, a transmitter (e.g., transmitter 202) may be configured to detect a change in an associated resonant frequency. It is noted that a change in resonant frequency may be detected by known methods, such as frequency discrimination. Thereafter, transmitter 202 may be configured to determine whether or not an associated charging region includes a valid chargeable device. By way of example, transmitter 202 (i.e., controller 214) may attempt to establish a communication link with the detected device to determine whether an associated charging region includes a valid chargeable device. Accordingly, in this embodiment, a self-oscillating circuit of transmitter 202 may remain on to detect a change in an associated resonant frequency, and upon detection of a change, other components of transmitter 202 may be powered to validate a device, transmit power to the device, or both.

Figure 6:
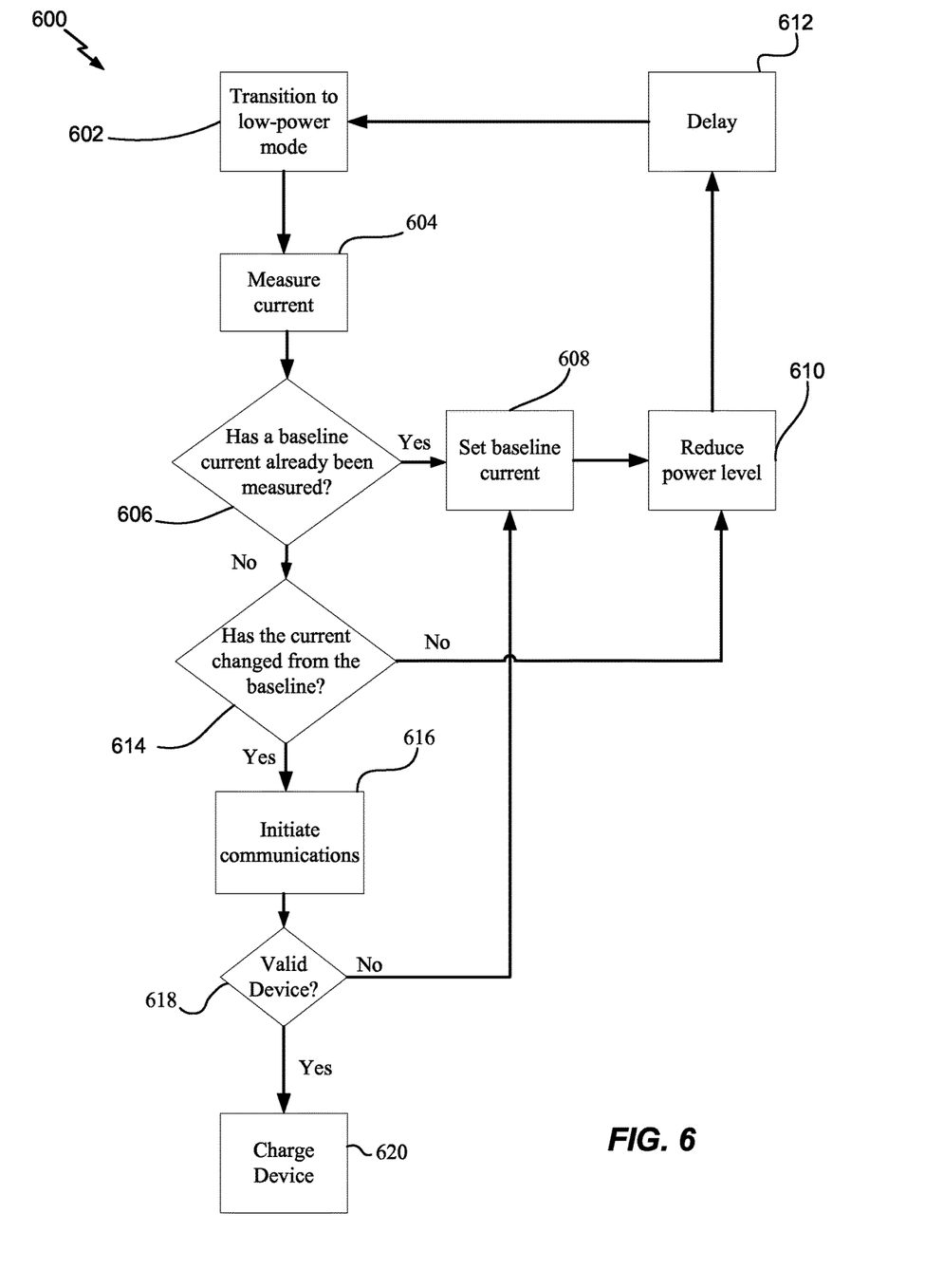
FIG. 6 is a flowchart illustrating a method, according to an exemplary embodiment of the present invention.

FIG. 6 illustrates a flowchart illustrating a method 600, in accordance with an exemplary embodiment of the present invention. Method 600 may include causing a transmitter (e.g., transmitter 202 of FIG. 4) to enter a low-power mode (depicted by numeral 602). The transmitter may enter a low-power mode while an associated charging region lacks any potential chargeable devices and the transmitter is not transmitting power. Furthermore, method 600 may include measuring a current sensed by the transmitter (depicted by numeral 604). Method 600 may further include determining whether a baseline current has been previously measured be the transmitter (depicted by numeral 606). For example only, if a baseline current has been previously measured, the baseline current may be stored within the transmitter. Conversely, if a baseline current has not been previously measured, the transmitter may not include a stored value for the baseline current.

If it is determined that the transmitter has not previously measured a baseline current, the measured current may be set as a baseline current (depicted by numeral 608). Thereafter, the power of the transmitter may be further decreased, or turned off entirely (depicted by numeral 610). After a short delay (depicted by numeral 612), method 600 may include causing a transmitter to enter the low-power mode (depicted by numeral 602).

Reverting back to step 606, if it is determined that the transmitter has previously measured a baseline current (e.g., the transmitter includes a stored value for a baseline current), the measured current may be compared to the stored baseline current (depicted by numeral 614). If the measured current is substantially equal to the baseline current, method 600 may proceed back to step 610, where the power of the transmitter may be further decreased, or turned off entirely. If the measured current is not substantially equal to the baseline current (i.e., an amount of current sensed by the transmitter has changed), a charging device may potentially be positioned within a charging region of the transmitter and the transmitter may determine whether an associated charging region includes a valid chargeable device (depicted by numeral 616). By way of example, the transmitter may determine whether an associated charging region includes a valid chargeable device by attempting to initiate a communication link with a device positioned within a near-field of the transmitter.

If the transmitter determines that a valid chargeable device exists (depicted by numeral 618) within the charging region (e.g., the transmitter successfully establishes a communication link with a chargeable device) the transmitter may transmit power thereto (depicted by numeral 620). If the transmitter determines that a valid chargeable device does not exist within the charging region (e.g., the transmitter is unable to establish a communication link with a chargeable device), method 600 may revert back to step 608, where the measured current may be set as the baseline current.

In comparison to conventional methods and devices, exemplary embodiments of the present invention may require less power to detect and validate chargeable devices positioned within a charging region of a wireless power transmitter. Furthermore, devices may be validated as wireless chargeable devices prior to transmitting power within the charging region.

Figure 7:
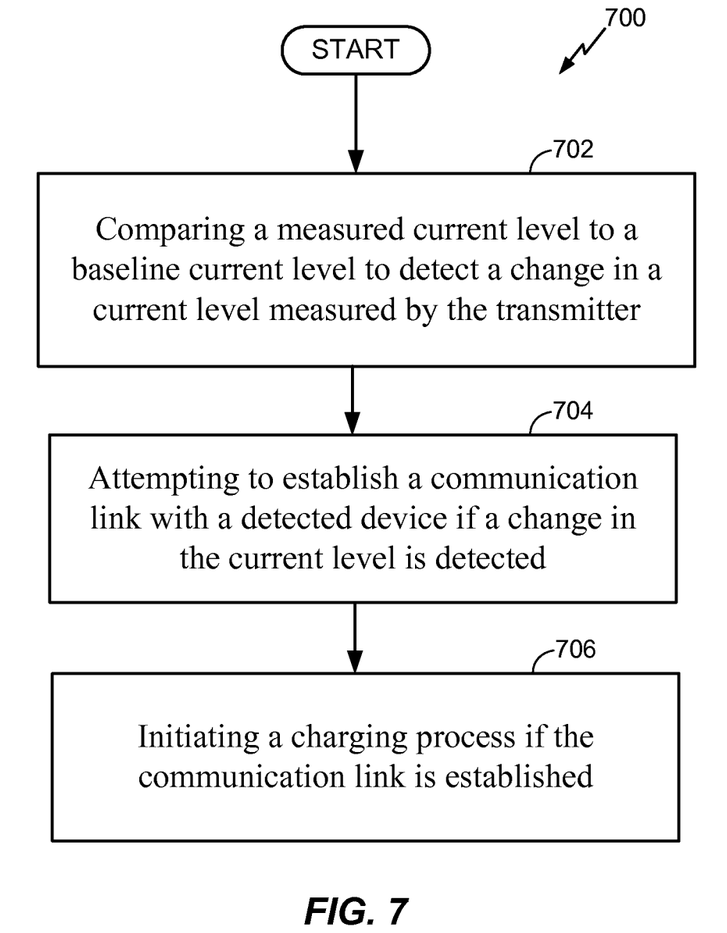
FIG. 7 is a flowchart illustrating another method, in accordance with an exemplary embodiment of the present invention.

FIG. 7 is a flowchart illustrating a method 700, in accordance with one or more exemplary embodiments. Method 700 may include comparing a measured current level to a baseline current level to detect a change in a current level measured by the transmitter (depicted by numeral 702). Further, method 700 may include attempting to establish a communication link with a detected device if a change in the current level is detected (depicted by numeral 704). Moreover, method 700 may include initiating a charging process if the communication link is established (depicted by numeral 706).

Figure 8:
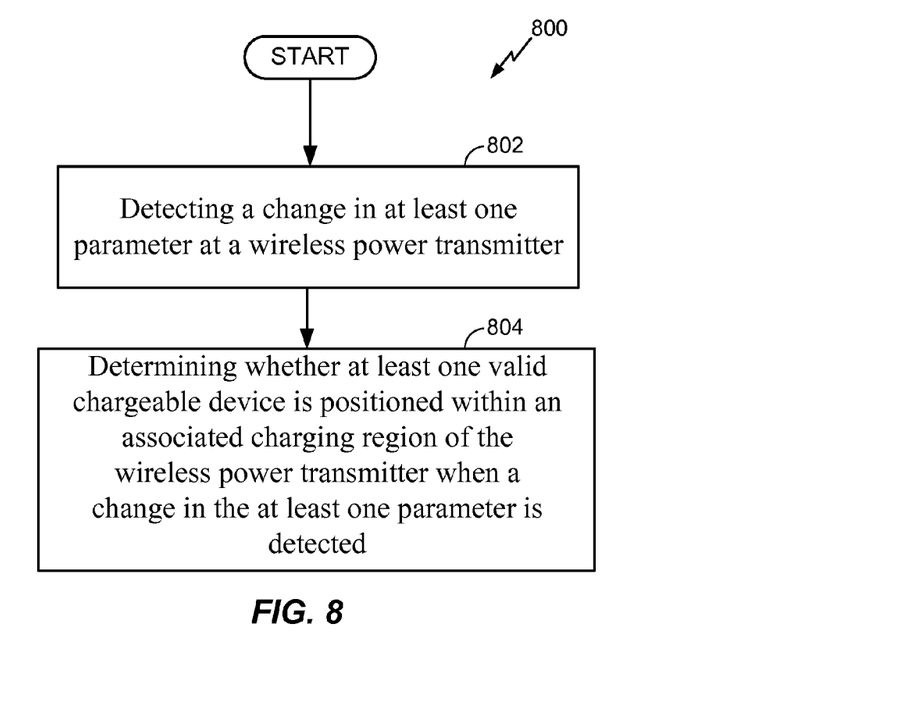
FIG. 8 is a flowchart illustrating yet another method, in accordance with an exemplary embodiment of the present invention.

FIG. 8 is a flowchart illustrating another method 800, in accordance with one or more exemplary embodiments. Method 800 may include detecting a change in at least one parameter at a wireless power transmitter (depicted by numeral 802). Method 800 may further include determining whether at least one valid chargeable device is positioned within an associated charging region of the wireless power transmitter when the change in the at least one parameter is detected (depicted by numeral 804).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
    a wireless power transmitter comprising a controller, the wireless power transmitter being configured to operate in each of a first power state and a second separate power state, the transmitter transmitting at a lower power level in the first power state than in the second power state; and
    a detector circuit configured to detect a change in at least one parameter at the wireless power transmitter,
    wherein the controller is configured to attempt to establish wireless data communication with at least one valid chargeable device in response to the detector circuit detecting the change in the at least one parameter at the wireless power transmitter;
    wherein the controller is further configured to determine whether the at least one valid chargeable device is positioned within a charging region of the wireless power transmitter based at least in part on whether the controller successfully established a wireless data communication link with the at least one valid chargeable device, and
    wherein the transmitter is further configured to transition to the first power state in response to the controller determining that the charging region lacks any valid chargeable devices and transition to the second power state in response to the controller determining that the at least one valid chargeable device is positioned within the charging region of the wireless power transmitter.

2. The device of claim 1, the at least one parameter comprising at least one of a current level at the transmitter, a resonant frequency of the transmitter, or an amount of reactance at the transmitter.

3. The device of claim 1, the transmitter further configured to measure an amount of current at a power amplifier of the transmitter.

4. The device of claim 3, the transmitter further configured to reduce a power level of the transmitter prior to measuring the amount of current.

5. The device of claim 1, the transmitter further configured to compare a measured amount of current at an associated power amplifier to a baseline current to detect a change in a current level at the transmitter.

6. The device of claim 1, the controller being further configured to attempt to establish the wireless data communication link upon the detection circuit detecting the change in the at least one parameter.

7. The device of claim 1, the transmitter further configured to initiate a time delay if a current level at the transmitter is substantially equal to a baseline current.

8. The device of claim 7, the transmitter further configured to reduce a power level thereof prior to initiating the time delay.

9. The device of claim 1, the transmitter further configured to set a previously measured current level as a baseline current level if the at least one valid chargeable device is not positioned within the charging region of the transmitter.

10. The device of claim 1, the transmitter including a load sensing circuit configured to measure a current level at a power amplifier within transmit circuitry of the transmitter.

11. The device of claim 1, the at least one parameter comprising an impedance value at the transmitter.

12. A method, comprising:
    detecting a change in at least one parameter at a wireless power transmitter;
    attempting to establish wireless data communication with at least one valid chargeable device in response to detecting the change in the at least one parameter at the wireless power transmitter;
    determining whether the at least one valid chargeable device is positioned within an associated charging region of the wireless power transmitter based at least in part on whether the controller successfully established a wireless data communication link with the at least one valid chargeable device;

operating the transmitter in one of at least a first power state or a second separate power state, the transmitter transmitting at a lower power level in the first power state than in the second power state; and transitioning the transmitter to the first power state in response to determining that the charging region lacks any valid chargeable devices or transitioning the transmitter to the second power state in response to the controller determining that the at least one valid chargeable device is positioned within the charging region of the wireless power transmitter.

13. The method of claim 12, the detecting comprising detecting a change in at least one of a current level at the transmitter, a resonant frequency of the transmitter, or an amount of reactance at the transmitter.

14. The method of claim 13, the detecting the change in a current level comprising comparing a measured current level to a baseline current level.

15. The method of claim 14, further comprising setting the baseline current level as the measured current level if the at least one valid chargeable device is not positioned within the associated charging region.

16. The method of claim 12, further comprising measuring and storing a baseline current level within the wireless power transmitter.

17. The method of claim 12, further comprising initiating a time delay if a measured current level at the wireless power transmitter is substantially equal to a baseline current.

18. The method of claim 17, further comprising reducing a power level of the wireless power transmitter prior to initiating the time delay.

19. The method of claim 12, the attempting to establish the wireless data communication link with the at least one valid chargeable device being performed upon detecting a change in the current level.

20. The method of claim 12, the detecting comprising detecting a change in an impedance value at the transmitter.

21. A device, comprising:
means for detecting a change in at least one parameter at a wireless power transmitter;
means for attempting to establish a wireless data communication link with at least one valid chargeable device in response to the detection of the change in the at least one parameter;
means for determining whether the at least one valid chargeable device is positioned within an associated charging region of the wireless power transmitter based at least in part on whether the means for attempting to establish a wireless data communication link successfully established the wireless data communication link with the at least one valid chargeable device prior;
means for operating the transmitter in each of a first power state and a second separate power state, the transmitter transmitting at a lower power level in the first power state than in the second power state;
means for transitioning the transmitter to the first power state in response to determining that the charging region lacks any valid chargeable devices; and
means for transitioning the transmitter to the second state in response to determining that the at least one valid chargeable device is positioned within the charging region of the transmitter.

22. The device of claim 21, further comprising means for detecting a change in a current level at the wireless power transmitter.

23. The device of claim 22, the means for detecting a change in the current level comprising means for comparing a measured current level to a baseline current level.

24. The device of claim 21, the means for attempting to establish the wireless data communication link further comprising means for attempting to establish the wireless data communication link with the at least one valid chargeable device upon detecting a change in the current level.

* * * * *